United States Patent [19]

Mitchell et al.

[11] 4,164,866

[45] Aug. 21, 1979

[54] APPARATUS FOR MONITORING AMOUNT AND DIRECTIONS OF FLUID FLOW IN FLUID POWER SYSTEMS

[75] Inventors: Henry M. Mitchell, Alloway, Scotland; John Elias, Llanerchymedd; John Moorcroft, Llanfairfechan, both of Wales

[73] Assignee: Mannin Industries Ltd., Castletown, Isle of Man

[21] Appl. No.: 893,269

[22] Filed: Apr. 5, 1978

[51] Int. Cl.² .............................................. G01F 1/10
[52] U.S. Cl. .................................................. 73/231 R
[58] Field of Search .............. 73/231 R, 229; 324/166

[56] References Cited

U.S. PATENT DOCUMENTS

| | | | |
|---|---|---|---|
| 2,671,174 | 3/1954 | Burgholz | 73/231 R X |
| 3,053,087 | 9/1962 | Waugh | 73/231 R |

FOREIGN PATENT DOCUMENTS 804333  11/1958  United Kingdom .................. 73/231 R Primary Examiner—James J. Gill
Attorney, Agent, or Firm—Lowe, Kokjer, Kircher, Wharton & Bowman

[57] ABSTRACT

A bladed rotor is mounted for rotation within a conduit for carrying fluid. A sensing element is also installed in the conduit and the sensing element and the rotor together, when connected in an electrical circuit, are capable of differentiation between opposite directions of rotation of the rotor.

3 Claims, 3 Drawing Figures

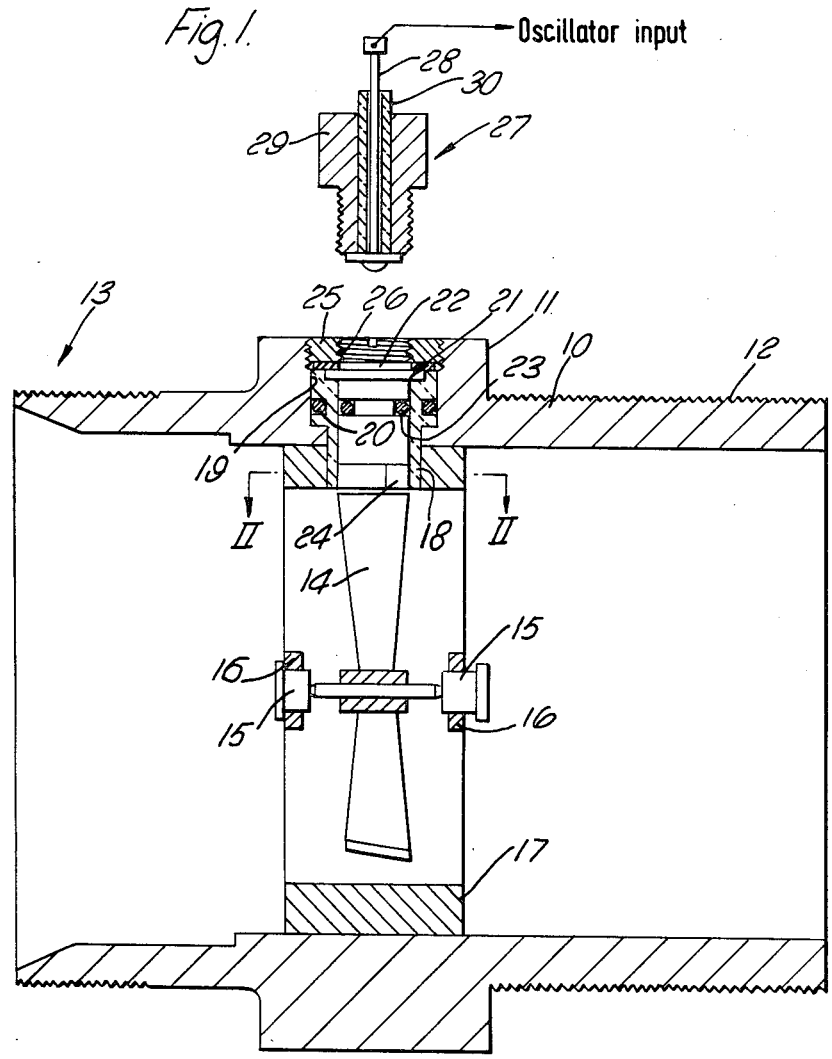
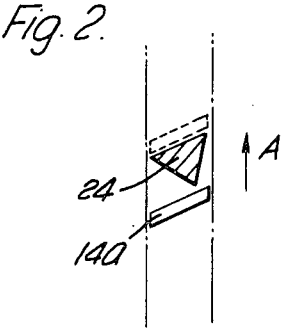

APPARATUS FOR MONITORING AMOUNT AND DIRECTIONS OF FLUID FLOW IN FLUID POWER SYSTEMS

BACKGROUND OF THE INVENTION

This invention relates to monitoring fluid flow in fluid power systems.

In apparatus for measuring the rate of fluid flow it has been proposed to measure the proportional rotational speed of a bladed or turbine-type rotor arranged in the path of the fluid. In the context of locating faults in fluid power systems, it is desirable to determine not only the fluid flow rate, but also the flow direction.

In the context of locating faults in fluid power systems, it is desirable to determine not only the fluid flow rate; but also the flow direction.

In one proposal during rotation of the rotor there is repeatedly presented to a magnetically permeable core of a fixed electromagnet magnetically permeable elements whereby to produce a cyclically varying reluctance. In this proposal the electromagnet is disposed in a blind radial bore which leaves a thin wall of a nonmagnetic material between the poles of the magnetically permeable core and the path of the magnetically permeable elements. The thin wall is needed so that the variation in reluctance is noticeable but is unsuitable in fluid power systems where considerable pressure is experienced by the fitting. In another proposal the rotation of the rotor co-operates with a fixed element to constitute a cyclically variable capacitor. However, the fixed element is mounted in a saddle applied over an opening through the wall. Again such an arrangement is unsuitable in fluid power systems where considerable pressure is experienced. Neither of these proposals provides means for differentiating between opposite directions of rotation of the rotor.

Such means are however provided in another proposal using a rotor responsive to fluid flow and during its rotation repeatedly interrupting the path of radiation through the thickness of the wall of a conduit and across the flow of fluid. In this proposal high pressures are considered and the rotor is inserted in the conduit in a system to be tested and the radiation equipment is clamped to the conduit. In this proposal there is no need to bore into or through the wall of the conduit. However, the mounting of the radiation equipment would present difficulties because it would involve mounting on opposite sides of the conduit a transmitter and a receiver of radiation. In the majority of fluid power systems proprietary control valves are used for the purposes of achieving changes in the direction of fluid flow, changes in the rate of fluid flow and changes in fluid pressure. Such valves are designed usually to international standards with a plate having a plurality of ports therein for connection with pipes via well known standard fittings which expression embraces a wide variety of proprietary coupling devices manufactured to standard dimensions prescribed by national or international bodies in the field of fluid power engineering. The close pitching of the ports and therefore of the standard fittings by means of which the pipes are coupled to the valve results in minimal clearance between any two standard fittings which precludes the adaptation of a flow measuring device such as according to the last mentioned proposal.

In fluid power systems, the location of faults by a service engineer involves a need to determine information as to fluid flow at various points in the system. Such information is obtained from flow measuring apparatus either temporarily or permanently incorporated in the fluid power system. The temporary incorporation of flow metering apparatus in a fluid power system has the disadvantages that the fluid power circuit has to be broken and that the operation is time consuming. Hitherto, the permanent incorporation of fluid measuring apparatus in a fluid power system has suffered the disadvantage that, because each flow metering unit is a relatively expensive item, the cost of incorporating several such units usually exceeds the limit of practical economy.

Since a fluid power system almost invariably incorporates a number of standard fittings, the incorporation of a flow responsive element in such a fitting achieves a cost saving in that the fitting serves not only its usual purpose, but also serves as the body or housing of a flow metering unit.

SUMMARY OF THE INVENTION

According to the present invention there is provided apparatus for a standard fitting for permanently connecting together an appliance and a pipe in a fluid power system, the standard fitting comprising a tubular body having coupling portions at opposite ends thereof, an annulus fitted within said tubular body and carrying a rotor having blades, said tubular body and said annulus each having an opening therethrough which openings are aligned transversely of the axis of rotation of the rotor, an electrically-insulating sealing sleeve received within the pair of said aligned openings, and an electrically conductive plug fitted within said sleeve and presenting inner and outer end faces, the inner end face of said plug being triangular with one side arranged substantially parallel with the end face of each said blade of said rotor when such blade is in the vicinity of said inner end face and the outer end face of said plug being provided for temporary contact with a probe terminal of a portable unit comprising the remainder of an electrical circuit in which said rotor and said plug together constitute a cyclically variable capacitor such that as each said blade of said rotor traverses the inner end face of said plug in one direction the capacity increases from a minimum value to a cut-off at a maximum value and as each said blade of said rotor traverses the inner end face of said plug in the opposite direction the capacity decreases from a cut-in at said maximum value to said minimum value, whereby the opposite direction of rotation of said rotor may be differentiated.

The aforesaid fitting may be used in conjunction with a portable electronic processing and indicating unit comprising a probe terminal in temporary contact with the outer end face of said plug, an oscillator for generating a signal for modulation by the cyclically variable capacitor constituted by said rotor and said plug, a demodulator and rectifier connected to an output of said oscillator, a differentiator connected to the output of said demodulator and rectifier, positive and negative peak detectors connected to the output of said differentiator, and indicating means connected to outputs of said peak detectors and adapted to give mutually different indications according to the electrical sum at the output of said peak detectors.

BRIEF DESCRIPTION OF THE DRAWINGS

An embodiment of the present invention will now be described, by way of example, with reference to the accompanying drawings in which:

FIG. 1 is a sectional elevation of a standard fitting (as hereinbefore defined) modified in accordance with the present invention for use in monitoring fluid flow in a fluid power system;

FIG. 2 is a sectional view on the line II—II in FIG. 1 of parts in FIG. 1; and

DETAILED DESCRIPTION

Figure 3:
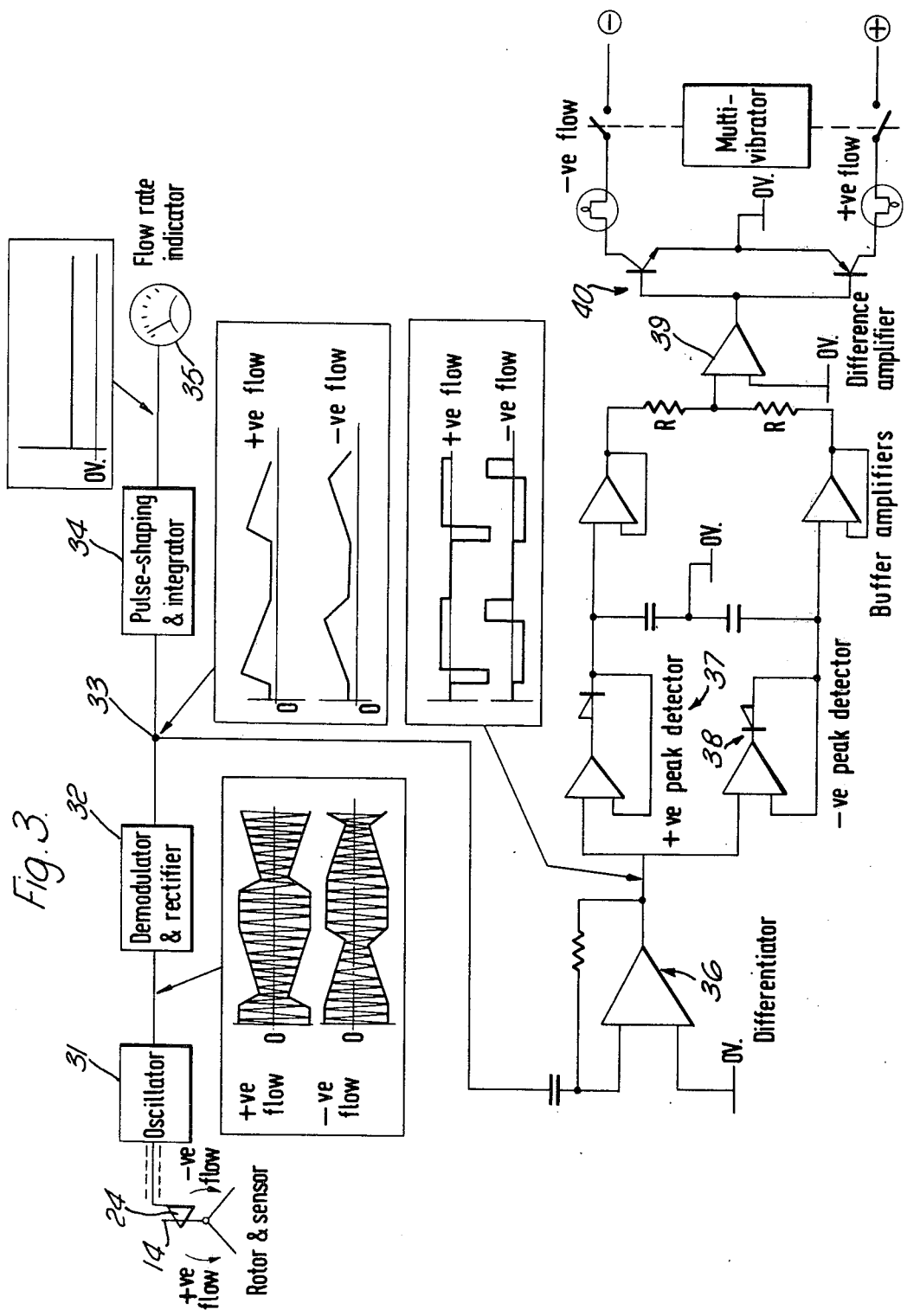
FIG. 3 is a diagrammatic representation of an electronic circuit for use in combination with the fitting shown in FIG. 1.

In FIG. 1 of the drawings, a standard fitting in the form of a stud coupling consists of a tubular body 10 having a conventional hexagonal external formation 11 for engagement by a wrench or spanner (not shown), an externally screw-threaded or stud portion 12 for insertion in a mating part in a fluid power appliance, manifold, sub-plate or flange and a coupling portion 13 for receiving a pipe or conduit by means of a conventional fitting (not shown). A flow-responsive element in the form of a bladed rotor 14 is incorporated within the body 10, the rotor 14 being mounted in low-friction bearings 15 supported in diametral cross-bars 16 secured to an annulus 17 fitted in the bore of the body 10. The annulus 17 is positively axially located by the inner end portion of an electrically insulating sleeve 18 which enters a mating through aperture in the wall of the annulus 17. The insulating sleeve 18 is received within a recessed opening 19 which extends between one of the "flats" or each of two diametrically opposite "flats" of the hexagonal formation 11 and the interior of the body 10, the sleeve 18 being stepped so as to seat within the opening 19, and also having an annular groove incorporating a sealing ring 20. An electrically conductive plug 21 is fitted within the sleeve 18. The outer end portion of the plug 21 is constituted by a flat head 22 which seats in a mating recess in the sleeve 18. The body of the plug 21 is of cylindrical configuration and has an annular groove incorporating a second sealing ring 23. The inner end portion 24 of the plug 21 is of triangular configuration in cross-section and lies flush with the internal wall surface of the annulus 17 closely adjacent the peripheral path of the rotor 14. The plug 21 positioned so that the attitude of the triangular end portion 24 with respect to the end face 14a of a rotor blade is such that one side of the triangular configuration lies parallel with the end face 14a according to the pitch of the blades of the rotor 14 (see FIG. 2). The assembly consisting of the sleeve 18 and plug 21 is retained by an externally screw-threaded plug 25 having an internally screw-threaded opening 26 for receiving a connecting terminal assembly 27 of which a central connecting pin 28 makes electrical contact with the head 22 when the terminal assembly is screwed into the opening 26. The pin 28 is electrically insulated from the electrically conducting body 29 of the terminal assembly by means of an insulating sleeve 30. Where there are two arrangements 18–26 provided, the terminal assembly 27 can be applied to either arrangement depending on the relative accessibility thereof.

The triangular portion 24 of the sensing element and the rotor 14 together constitute a cyclically variable capacitor. As the end face 14a of each blade of the rotor 14 traverses the triangular portion 24, there is increased electrical capacitance between the plug 21 and the body 10. Further due to the triangular configuration, the manner in which the capacitance varies during each traverse in one direction is different from the manner of variation during each traverse in the opposite direction. The difference is explained by FIG. 2 from which it can be seen that as each blade end face 14a traverses the portion 24 in the direction of arrow A, the overlap area, and therefore the capacitance, increases from a minimum value to a cut-off at a maximum value. Conversely, movement in the opposite direction causes capacitance to decrease from a cut-in at said maximum value to the minimum value. Thus, the sensing element and the rotor are capable of affecting an electrical signal whose waveform is asymmetrical.

In use, stud couplings modified as above described are incorporated permanently at various points in a fluid power system in place of standard unmodified stud couplings. A portable electronic processing and indicating unit is connected to one or more selected sensing elements in turn by means of a terminal assembly 27, or by means of a simple probe, when information is required as to fluid flow in parts of the hydraulic system. The principal features of the portable unit are as follows.

In FIG. 3, the cyclically varying or fluctuating capacitance between the rotor 14 and the triangular portion 24 of the sensor modulates a relatively high frequency signal generated by an oscillator 31, the output from which is demodulated and rectified by conventional demodulating and rectifying circuitry 32 to produce an asymmetrical waveform at point 33. The shape of the waveform at point 33 is dependent upon the direction of rotation of the rotor 14, and the frequency is proportional to the rotor speed which is substantially proportional to the fluid flow rate. From point 33, the signal is processed by pulse-shaping and integrating circuits 34 the output from which provides an analogue or digital indication of flow rate of a meter 35 in a conventional manner. From point 33, the signal is also processed to obtain an indication of flow direction as follows. The signal is fed to the input of a differentiator 36 the output from which is passed to positive and negative peak detectors 37 and 38 respectively which cause a potential at the junction of equal resistors R to be positive or negative depending upon the rotation direction of the rotor 14. This potential, amplified by a difference amplifier 39 is used to trigger flow direction indicating means in the form of a selective lamp drive circuit 40.

Modifications of the above-described embodiment within the scope of the present invention include using standard fittings other than stud couplings, for example standard sub-plates, flanges or manifolds.

We claim:

1. A standard fitting for permanently connecting together an appliance and a pipe in a fluid power system, the standard fitting comprising a tubular body having coupling portions at opposite ends thereof, an annulus fitted within said tubular body and carrying a rotor having blades, said tubular body and said annulus each having an opening therethrough which openings are aligned transversely of the axis of rotation of the rotor, an electrically-insulating sealing sleeve received within the pair of said aligned openings, and an electrically conductive plug fitted within said sleeve and presenting inner and outer end faces, the inner end face of said plug being triangular with one side arranged substantially parallel with the end face of each said blade of said rotor when such blade is in the vicinity of said inner end face and the outer end face of said plug being provided for temporary contact with a probe terminal of a portable unit comprising the remainder of an electrical circuit in which said rotor and said plug together constitute a cyclically variable capacitor such that as each said blade of said rotor traverses the inner end face of said plug in one direction the capacity increases from a minimum value to a cut-off at a maximum value and as each said blade of said rotor traverses the inner end face of said plug in the opposite direction the capacity decreases from a cut-in at said maximum value to said minimum value, whereby the opposite direction of rotation of said rotor may be differentiated.

2. A standard fitting according to claim 1, wherein said tubular body and said annulus each have two openings therethrough diametrically opposite each other, each said opening in said tubular body being aligned transversely of the axis of rotation of the rotor with a respective one of said openings in said annulus, an electrically-insulating sleeve is received with each pair of said aligned openings, and an electrically conductive plug fitted within said sleeve and presenting inner and outer end faces, the inner end face of said plug being triangular with one side arranged substantially parallel with the end face of each said blade of said rotor when such blade is in the vicinity of said inner end face and the outer end face of said plug being provided for selective temporary contact with the probe terminal of the portable unit.

3. In combination with a standard fitting according to claim 1, a portable electronic processing and indicating unit comprising a probe terminal in contact with the outer end face of said plug, an oscillator for generating a signal for modulation by the cyclically variable capacitor constituted by said rotor and said plug, a demodulator and rectifier connected to an output of said oscillator, a differentiator connected to the output of said demodulator and rectifier, positive and negative peak detectors connected to the output of said differentiator, and indicating means connected to outputs of said peak detectors and adapted to give mutually different indications according to the electrical sum at the outputs of said peak detectors.

* * * * *